United States Patent [19]

Atashroo

[11] Patent Number: 5,703,970
[45] Date of Patent: Dec. 30, 1997

[54] METHOD OF AND APPARATUS FOR IMPROVED IMAGE CORRELATION

[75] Inventor: M. Ali Atashroo, Maitland, Fla.

[73] Assignee: Martin Marietta Corporation, Bethesda, Md.

[21] Appl. No.: 487,832

[22] Filed: Jun. 7, 1995

[51] Int. Cl.$^6$ .................................................. G06K 9/64
[52] U.S. Cl. ............................................ 382/278; 382/280
[58] Field of Search ........................... 382/278, 276, 382/218, 280, 277; 364/726, 728.03, 728.05

[56] References Cited

U.S. PATENT DOCUMENTS

| | | | |
|---|---|---|---|
| H741 | 2/1990 | Powell et al. | 342/25 |
| 4,084,255 | 4/1978 | Casasent et al. | 382/278 |
| 4,462,046 | 7/1984 | Spight | 382/141 |
| 4,890,160 | 12/1989 | Thomas | 348/429 |
| 4,998,286 | 3/1991 | Tsujiuchi et al. | 382/278 |
| 5,020,111 | 5/1991 | Weber | 382/211 |
| 5,089,982 | 2/1992 | Gran et al. | 364/726 |
| 5,196,688 | 3/1993 | Hesse et al. | 250/203.6 |
| 5,216,541 | 6/1993 | Takesue et al. | 382/210 |
| 5,315,668 | 5/1994 | O'Hair | 382/280 |
| 5,524,845 | 6/1996 | Sims et al. | 244/3.17 |
| 5,535,291 | 7/1996 | Spencer et al. | 382/276 |
| 5,537,435 | 7/1996 | Carney et al. | 375/219 |

OTHER PUBLICATIONS

F. J. Harris, "The Discrete Fourier Transform Applied to Time Domain Signal Processing", *IEEE Communications Magazine*, May 1982, pp. 13–22.

B. Ho., "Fast Fourier Transform Correlation Versus Direct Discrete Time Correlation", *Proceedings of the IEEE*, Sep.1968, pp. 1602–1604.

*Primary Examiner*—Yon J. Couso
*Attorney, Agent, or Firm*—Burns, Doane, Swecker & Mathis, LLP

[57] ABSTRACT

A method of and apparatus for computing correlating images using the one dimensional Fast Fourier Transform (FFT) and the symmetry property of the Fourier Transform. In one aspect, the invention is a method of correlating images in the form of a pair of real number arrays. Apparatus for carrying the method out is also disclosed and claimed.

16 Claims, 4 Drawing Sheets

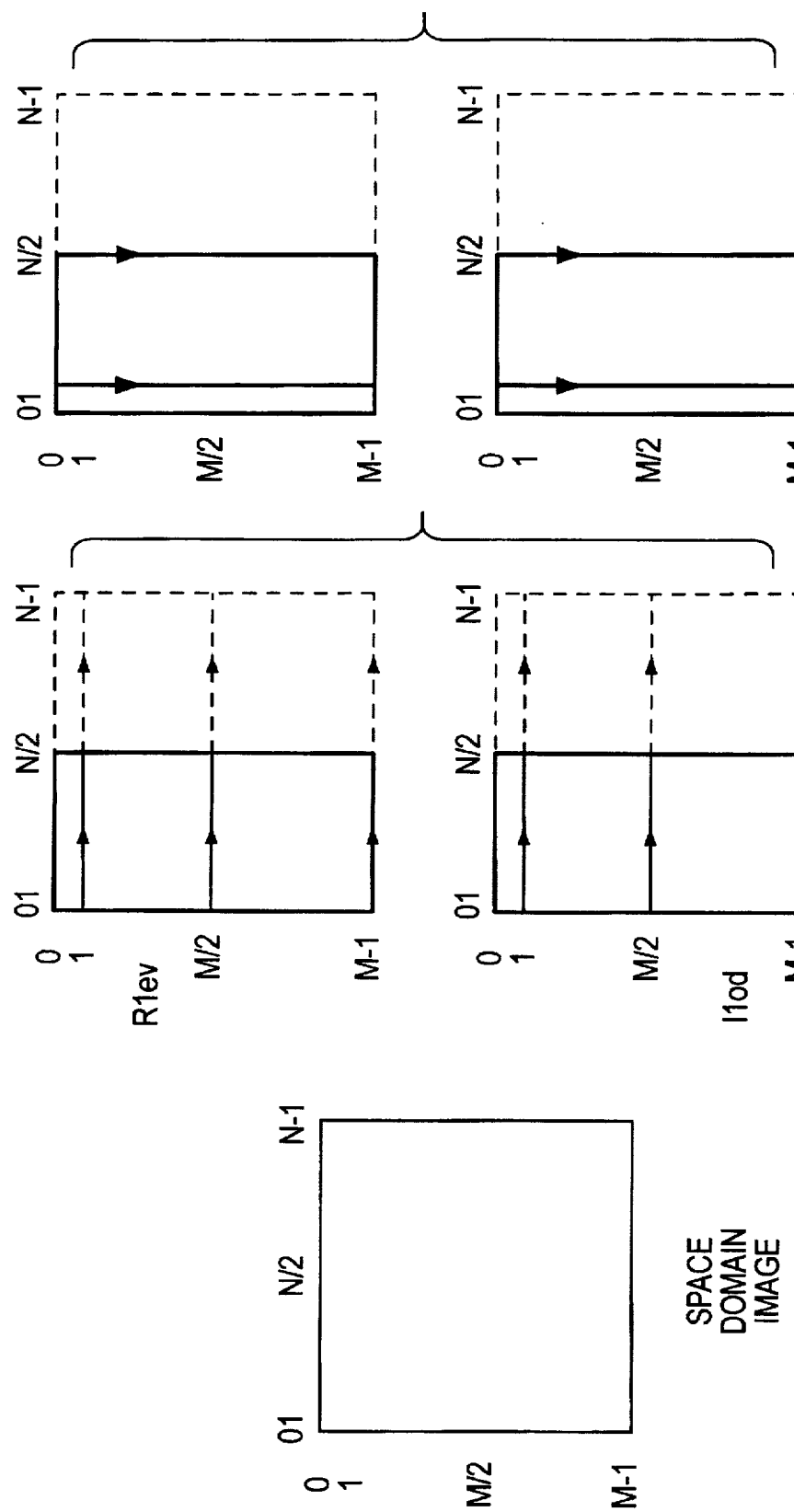

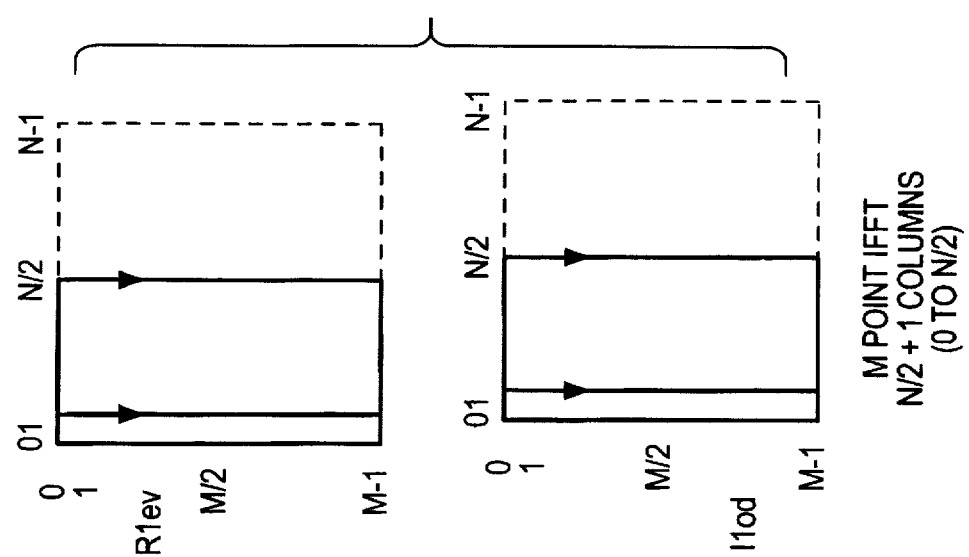
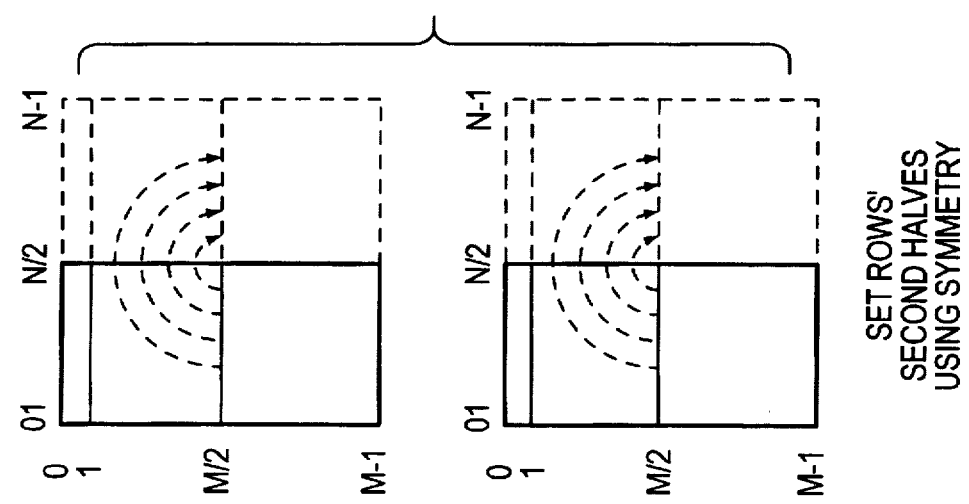
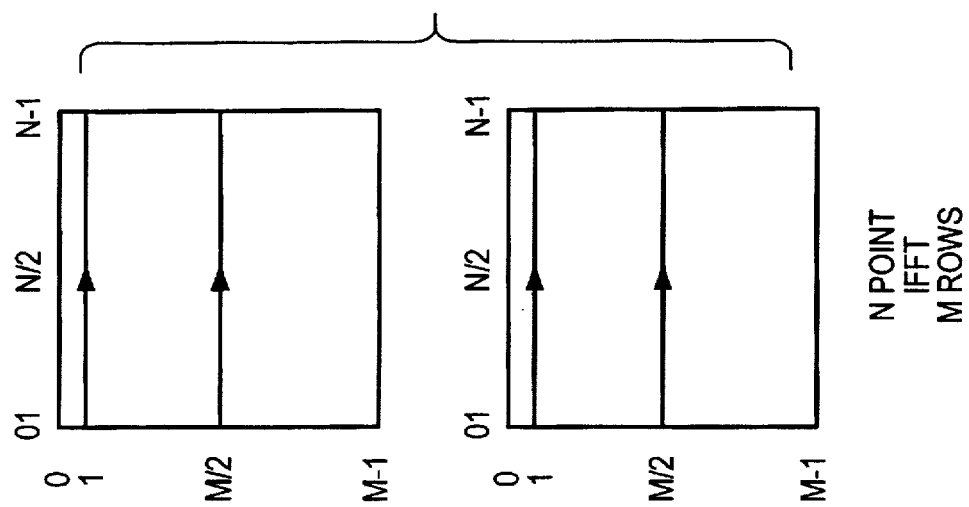

METHOD OF AND APPARATUS FOR IMPROVED IMAGE CORRELATION

BACKGROUND

This invention relates generally to an apparatus for and method of correlating two images.

Image correlation is useful in several areas of practical application. As an example, consider object identification, where the correlation would be between an acquired actual image and a reference image. For object tracking, the correlation might be between two successively acquired images of the same scene to identify movement of the object in the scene.

One drawback of using image correlation for these purposes is that the correlations are usually computationally intensive and the computational load increases significantly as the image resolution (array size) increases. For example, consider an image acquired as an array of picture elements or pixels. The size of the array is characterized as the product of the number of rows ("M") and the number of columns ("N"). A useful correlation for such an M by N array and another of like size is the cross circular correlation function. The computational load for the known direct method of computing the circular cross correlation function of two M by N arrays is of Order $((M*N)^2)$. This makes correlation for some applications such as real time image tracking impractical or at best requires very fast computing devices.

SUMMARY OF THE INVENTION

There thus is a need for an efficient apparatus for and method of correlating images which can be used with image arrays of larger size without incurring excessive increases in required computation. This need is met in the present invention through provision of an apparatus for and method of correlating two images which makes it possible to run real time (60 Hz frame rate) image tracking using off-the-shelf processors. In a method according to the invention, the cross circular correlation function of two M by N real image arrays is orders of magnitude faster than the direct method. More precisely, the computational load for the method according to the invention is of Order $((M*N) \log (M*N))$ compared with the Order $((M*N)^2)$ for direct method of computing the circular cross correlation function.

More particularly, these ends are achieved through provision of a method of correlating a first image and a second image, the first image being in the form of a first real array having a size M by N and the second image being in the form of a second real array having a size M by N, M and N being positive integers and preferably powers of 2. (Here, as in the rest of the specification including the claims, the term "real array" is used in its conventional sense as referring to an array of real numbers. Similarly, the term "complex array" is used in its conventional sense of an array including at least some complex numbers.) The method comprises the steps of performing a first domain transform on the first real array to produce a first complex array having a size M by (N/2+1) and performing a second domain transform on the second real array to produce a second complex array having a size M by (N/2+1). The first complex array and the second complex array are then multiplied to produce an intermediate complex array having a size M by (N/2+1). A first inverse domain transform is performed on each of the columns of the intermediate complex array to produce an inverse transformed intermediate complex array which is then supplemented by determining elements for additional columns by symmetry for each row. A second inverse domain transform is performed on each of the M rows of the supplemented complex array to produce a real correlation matrix having a size M by N, and the first image and the second image are correlated on the basis of the real correlation matrix.

The first and second domain transforms may be performed concurrently or successively. They are preferably real two dimensional fast fourier transforms. The first and second inverse domain transforms are preferably inverse fast fourier transforms. The first image may be an image of a scene and the second image may be an image of the scene at a later time. The method may then comprise the additional steps acquiring the images, and the final step may include tracking an object in the scene on the basis of the real correlation matrix.

The first image may also be a predetermined reference image and the second image may be an acquired image of a scene. The method may then comprise the additional steps of storing the first image and acquiring the second image, and the last step may include recognizing an object in the scene on the basis of the real correlation matrix.

The results of the correlation may also be displayed or stored or both.

In another aspect, the invention is an apparatus for correlating a first image and a second image, the first image being in the form of a first real array having a size M by N and the second image being in the form of a second real array having a size M by N, M and N being positive integers and preferably powers of 2. The apparatus comprises a first domain transformer for performing a first domain transform on the first real array to produce a first complex array having a size M by (N/2+1) and a second domain transformer for performing a second domain transform on the second real array to produce a second complex array having a size M by (N/2+1). A multiplier, responsive to the first domain transformer and the second domain transformer, multiplies the first complex array by the second complex array to produce an intermediate complex array having a size M by (N/2+1). First inverse domain transform means, responsive to the multiplier, performs a first inverse domain transform on each of the columns of the intermediate complex array to produce an inverse transformed intermediate complex array. Supplementing means, responsive to the first inverse domain transform means, produces a supplemented complex array having size M by N from the inverse transformed intermediate complex array by determining elements for additional columns by symmetry for each row. Second inverse domain transform means, responsive to the supplementing means, perform a second inverse domain transform on each of the M rows of the completed complex array to produce a real correlation matrix having a size M by N, and correlating means, responsive to the second inverse transform means, correlates the first image and the second image on the basis of the real correlation matrix.

The first and second domain transformers preferably perform real two dimensional fast fourier transforms. The first and second inverse domain transformers preferably perform inverse fast fourier transforms.

The apparatus may further comprise means for acquiring the first image and the second image at successive times, and the correlating means may comprise means for tracking an object in the scene on the basis of results of the real correlation matrix.

The apparatus may further comprise means for storing the first image at a first time and means for acquiring the second image at a second time later than the first time, and the correlating means may comprise means for recognizing an object in the scene on the basis of remits of the real correlation matrix.

The apparatus may also include means for displaying results of the correlating and means for storing the real correlation matrix.

DESCRIPTION OF THE FIGURES

FIGS. 3(a)-3(c) are diagrams showing aspects of an improved image correlation method according to the present invention.

FIGS. 4(a)-4(c) are diagrams showing aspects of an improved image correlation method according to the present invention.

DETAILED DESCRIPTION OF PREFERRED EMBODIMENTS

Figure 1:
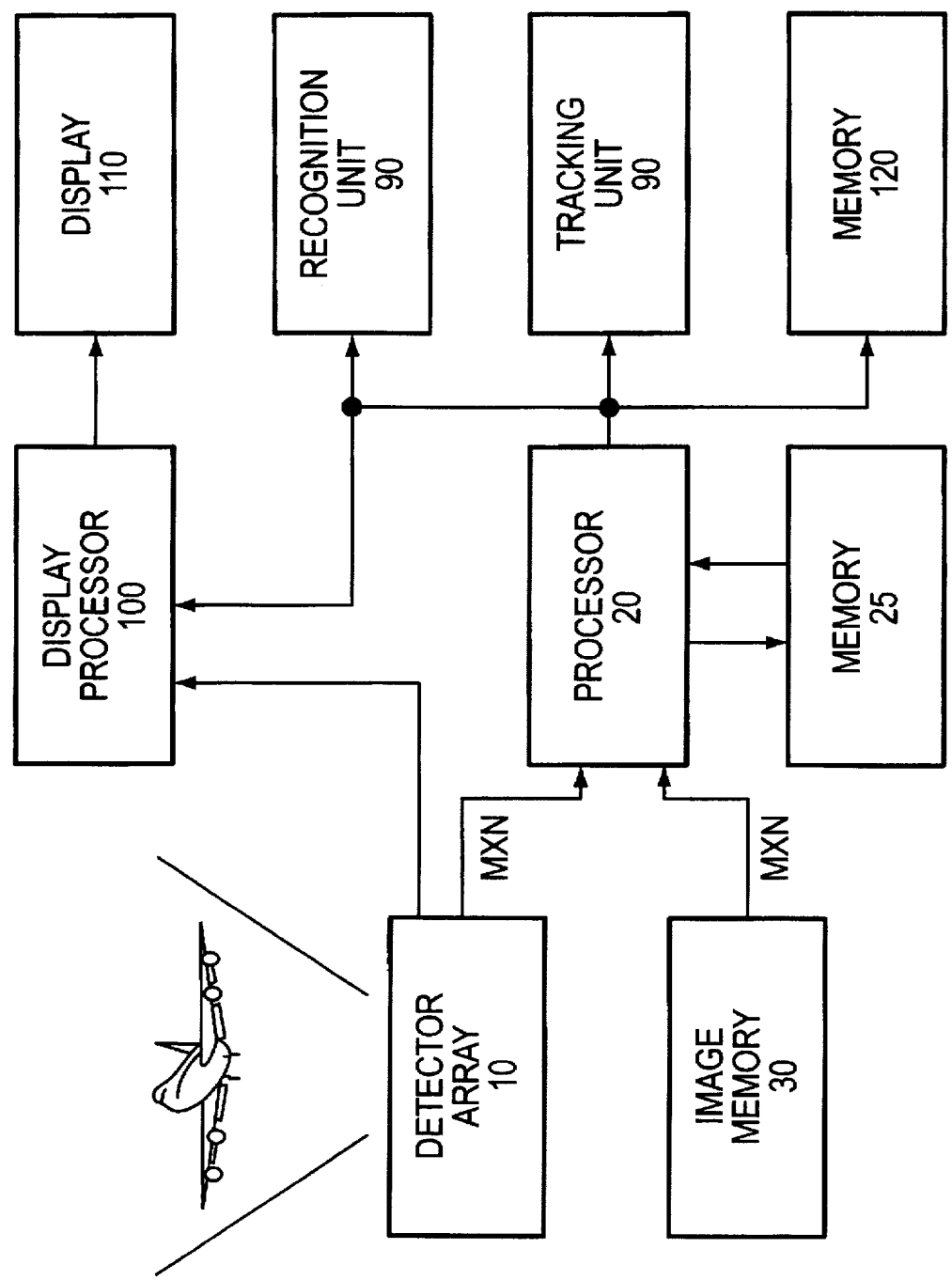
FIG. 1 is a diagrammatic view of an improved image correlation system according to one embodiment of the present invention.

FIG. 1 shows a typical application for an image correlator according to the present invention. Means for acquiring an image, embodied as a detector array 10 in the depicted arrangement, acquires an image of a scene which may include an object and renders the image as a first two dimensional M by N array of picture elements. This array is provided to a processor 20 which is described in more detail below. The processor 20 also receives a second two dimensional M by N array from an image memory 30. In object recognition, the second M by N array will be an image of a known object for comparison with the acquired image. In object tracking, the second M by N array will be an earlier acquired image or frame of the scene viewed by the detector array 10 stored to permit a determination of movement of objects in the scene.

The processor 20 correlates the first and second arrays. More particularly, the processor 20 computes the cross correlation of first and second arrays using the one dimensional Fast Fourier Transform (FFT) and the symmetry property of Fourier Transform. The processor 20 can be implemented as any off-the-shelf FFT processor, a digital signal processor, or general purpose processor suitably programmed with a program stored in a memory 25 to perform one dimensional FFT and/or arithmetic operations in hardware or software. The memory 25 may be a hard disk, ROM, RAM, or removable magnetic media such as a diskette.

Figure 2:
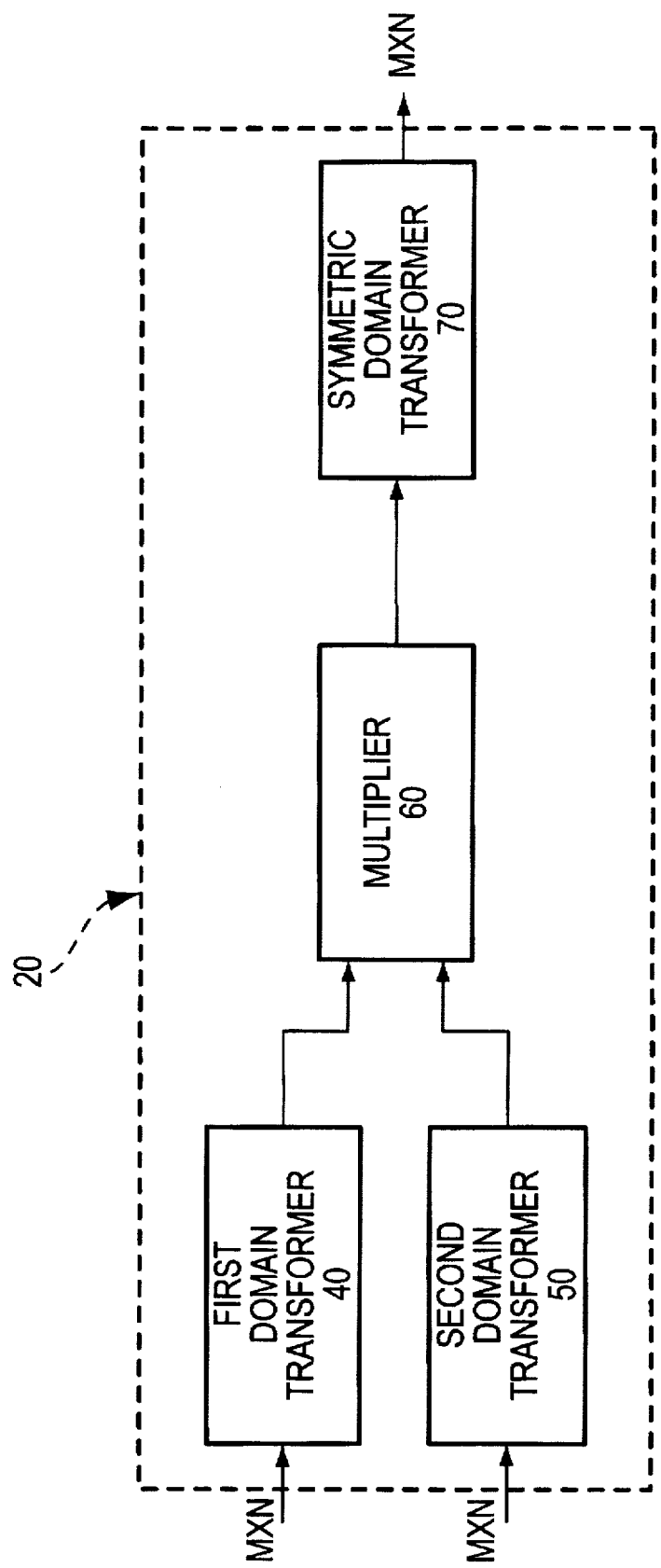
FIG. 2 is a more detailed diagrammatic view of one element of the embodiment of FIG. 1.

FIG. 2 is a functional block diagram of the processor 20. As mentioned, the inputs are two two-dimensional real image arrays of M by N size. The output of the processor 20 is the real circular cross correlation function array of size M by N of the input arrays. There are three distinct aspects to the processing, represented as distinct blocks in FIG. 2. It will be understood by one of ordinary skill in the art, however, that rendering these aspects of the invention as three blocks is not intended to imply that separate structures are necessary and that the various aspects could all be implemented on, for example, one processor programmed to perform the operations sequentially with the program according to the following method being stored in the memory 25.

The first array first undergoes a domain transform in a first domain transformer 40. In the preferred embodiment, the domain transform effected by first domain transformer 40 is a real two-dimensional FFT. When so embodied, the output of the first domain transformer 40 is half of a complex but symmetric array of size M by N. This process is depicted schematically in FIG. 3. The real component of the array output by first domain transformer 40, R1ev, is an even array, i.e., $$R1ev(m,n)=R1ev(m,N-n)$$

where
m=0, . . . , M−1, and
n=N/2+1, . . . , N−1.
Its imaginary component, I1od, is an odd array, that is, $$I1od(m,n)=-I1od(m,N-n)$$

where
m=0, . . . , M−1, and
n=N/2+1, . . . , N−1.
Therefore, the output complex array is of the size M by (N/2+1).

Similarly, the second array undergoes a domain transform in a second domain transformer 50. Operation of the second domain transformer 50 may occur in parallel that of the first domain transformer 40. In the preferred embodiment, the domain transform effected by second domain transformer 50 is also a real two-dimensional FFT. When so embodied, the output of the first domain transformer 50 is half of a complex but symmetric array of size M by N. Its real component, R2ev, is an even array, that is, $$R2ev(m,n)=R2ev(m,N-n)$$

where
m=0, . . . , M−1, and
n=N/2+1, . . . , N−1.
Its imaginary component, I2od, is an odd array, so that $$I2od(m,n)=-I2od(m,N-n)$$

where
m=0, . . . , M−1, and
n=N/2+1, . . . , N−1.
Therefore, the output complex array is of the size M by (N/2+1).

As shown in more detail in FIG. 3(a), the input to the first domain transformer 40 is a real array of size M by N. (The processing for the second array is the same and so is not separately described.) The output as shown in FIGS. 3(b) and 3(c) is the first (N/2+1) columns of a symmetric complex array of size M by N that is the two-dimensional Discrete Fourier Transform (DFT) of the input real array. The transform involves a first step (FIG. 3(b)) in which a real one-dimensional N-point FFT is used to compute the Discrete Fourier Transform (DFT) of each of the M rows of the input array. The DFT of each row is a complex but symmetric row. Therefore, only the first (N/2+1) points of each row's DFT are stored in the corresponding row as the outputs, thus building a complex array of size M by (N/2+1).

In the second step, a one-dimensional M-point FFT is used to compute the DFT of each of the (N/2+1) columns of the array created in first step. Each column's DFT is stored in its corresponding column as an output of the second step, thus building a complex array of size M by (N/2+1).

As mentioned, the two input arrays can undergo this process simultaneously (in parallel) or sequentially (in serial). Either way, there are two output complex arrays, each of which is of size M by (N/2+1) and each of which represents the first half of each of the original real images' 2-D DFT's. The multiplier 60 computes the point product of each corresponding pair of the two input complex arrays after conjugating the complex numbers in one of the input complex arrays, and, then stores the result in a corresponding position. The output of the multiplier 60 is also a complex array of size M by (N/2+1) that is half of a whole symmetric complex array. Its real component, Rev, is an even array, and its imaginary component, Iod, is an odd array. The elements of the output array are the products of the two complex input arrays, i.e., $$Rev(m,n)=R1ev(m,n)*R2ev(m,n)+I1od(m,n)I2od(m,n)$$

$$Iod(m,n)=R1ev(m,n)*I2od(m,n)-R2ev(m,n)*I1od(m,n)$$

where $m=0, \ldots, M-1$ $n=0, \ldots, N/2$.

The complex output array of size M by (N/2+1) is provided to a symmetric domain transformer 70. In the preferred embodiment, the symmetric domain transform is the symmetric two-dimensional Inverse Fast Fourier Transform (IFFT). In a first step of implementation, as shown in FIG. 4(a), a one-dimensional M-point IFFT computes the Inverse Discrete Fourier Transform (IDFT) of each of the (N/2+1) complex columns of the input array and stores the result in corresponding column. Then, as shown in FIG. 4(b), the second half of each row of the resulting array is set using the symmetry property of Fourier Transform to create a supplemented array. That is:

$$Rev(m,n)=Rev(m,N-n)$$

$$Iod(m,n)=-Iod(m,N-n)$$

where $m=0, \ldots, M-1$ $n=N/2+1, \ldots, N-1$.

Next, as shown in FIG. 4(c), the one-dimensional N-point IFFT computes the IDFT of each of the complex but symmetric M rows of the supplemented array. Only the real component of the result is stored in the corresponding row. The imaginary component of the result will necessarily be zero.

The output of the symmetric domain transformer 70 is the real circular cross-correlation function array, i.e., real correlation matrix, of size M by N. This result can be used in any of several ways. For example, the result can be provided to a tracking unit 80 which uses the result to track an object in the observed scene. Alternatively or additionally, the result may be provided to a recognition unit 90 which provides an indication or takes some required action on the basis of the existence of a threshold degree of correlation. The resulting real cross correlation function array may also be supplied to a display processor so that information indicative of a degree of correlation can be displayed on a display 110. The resulting real cross correlation function array may also be stored in a memory 120 for later use.

The image correlation method and apparatus described above provides significant benefits in the area of image correlation. For example, when implemented as a real time image tracking seeker, off-the-shelf hardware may be used to compute the cross correlation function of two 64 by 64 image arrays in less than 1/120th of a second. The invention also minimizes the shuffling of data into and out of the off-the-shelf processor.

The invention has been described above in terms of specific embodiments for the purposes of illustration only. Many variations of the embodiments described are possible without departing from the essential aspects of the invention. The invention should therefore not be regarded as being limited to those embodiments, but should instead be regarded as being fully commensurate in scope with the following claims.

What is claimed is:

1. A method of correlating a first image and a second image, said first image being in the form of a first real array having a size M by N and said second image being in the form of a second real array having a size M by N, M and N being positive integers, the method comprising the computer implemented steps of:

(a) performing a first domain transform on said first real array to produce a first complex array having a size M by (N/2+1);

(b) performing a second domain transform on said second real array to produce a second complex array having a size M by (N/2+1);

(c) multiplying a conjugate of said first complex array by said second complex array to produce an intermediate complex array having a size M by (N/2 +1);

(d) performing a first inverse domain transform on each of the columns of the intermediate complex array to produce an inverse transformed intermediate complex array;

(e) producing a supplemented complex array having size M by N from said inverse transformed intermediate complex array by determining elements for additional columns by symmetry for each row;

(f) performing a second inverse domain transform on each of the M rows of said supplemented complex array to produce a real correlation matrix having a size M by N; and (g) correlating said first image and said second image on the basis of said real correlation matrix.

2. A method of correlating a first image and a second image as claimed in claim 1, wherein said first and second domain transforms are performed concurrently.

3. A method of correlating a first image and a second image as claimed in claim 1, wherein said first and second domain transforms are performed successively.

4. A method of correlating a first image and a second image as claimed in claim 1, wherein said first and second domain transforms are real two dimensional fast fourier transforms.

5. A method of correlating a first image and a second image as claimed in claim 4, wherein said first and second inverse domain transforms are inverse fast fourier transforms.

6. A method of correlating a first image and a second image as claimed in claim 1, wherein said first image is an image of a scene and said second image is an image of said scene at a later time, comprising additional steps before said step (a) of:

acquiring said first image at a first time; and acquiring said second image at a second time later than said first time, and wherein said step (g) comprises tracking an object in said scene on the basis of said real correlation matrix.

7. A method of correlating a first image and a second image as claimed in claim 1, wherein said first image is a predetermined reference image and said second image is an acquired image of a scene, comprising additional steps before said step (a) of:

storing said first image at a first time; and acquiring said second image at a second time later than said first time, and wherein said step (g) comprises recognizing an object in said scene on the basis of said real correlation matrix.

8. A method of correlating a first image and a second image as claimed in claim 1, comprising an additional step after said step (g) of displaying results of said correlating.

9. A method of correlating a first image and a second image as claimed in claim 1, comprising an additional step after said step (g) of storing said real correlation matrix.

10. Apparatus for correlating a first image and a second image, said first image being in the form of a first real array having a size M by N and said second image being in the form of a second real array having a size M by N, M and N being positive integers, the apparatus comprising:

- a first domain transformer for performing a first domain transform on said first real array to produce a first complex array having a size M by (N/2+1);
- a second domain transformer for performing a second domain transform on said second real array to produce a second complex array having a size M by (N/2 +1);
- a multiplier, responsive to said first domain transformer and said second domain transformer, for multiplying a conjugate of said first complex array by said second complex array to produce an intermediate complex array having a size M by (N/2+1);
- first inverse domain transform means, responsive to the multiplier, for performing a first inverse domain transform on each of the columns of the intermediate complex array to produce an inverse transformed intermediate complex array;
- supplementing means, responsive to the first inverse domain transform means, for producing a supplemented complex array having size M by N from said inverse transformed intermediate complex array by determining elements for additional columns by symmetry for each row;
- second inverse domain transform means, responsive to the supplementing means, for performing a second inverse domain transform on each of the M rows of the completed complex array to produce a real correlation matrix having a size M by N; and
- correlating means, responsive to the second inverse transform means, for correlating said first image and said second image on the basis of said real correlation matrix.

11. Apparatus as claimed in claim 10, wherein said first and second domain transformers perform real two dimensional fast fourier transforms.

12. Apparatus as claimed in claim 11, wherein said first and second inverse domain transformers perform inverse fast fourier transforms.

13. Apparatus as claimed in claim 10, wherein said first image is an image of a scene and said second image is an image of said scene at a later time, wherein said apparatus further comprises means for acquiring said first image and said second image at successive times, and wherein said correlating means comprises means for tracking an object in said scene on the basis of results of said real correlation matrix.

14. Apparatus as claimed in claim 10, wherein said first image is a predetermined reference image and said second image is an acquired image of a scene, wherein said apparatus further comprises means for storing said first image at a first time and means for acquiring said second image at a second time later than said first time, and wherein said correlating means comprises means for recognizing an object in said scene on the basis of results of said real correlation matrix.

15. Apparatus as claimed in claim 10, further comprising means, responsive to said correlating means, for displaying results of said correlating.

16. Apparatus as claimed in claim 10, further comprising means, responsive to said correlating means, for storing said real correlation matrix.

* * * * *